(12) United States Patent
Eshelman

(10) Patent No.: US 10,927,026 B1
(45) Date of Patent: Feb. 23, 2021

(54) REMOTELY CONTROLLABLE MOBILE WASTEWATER EVAPORATION SYSTEM

(71) Applicant: WATER EVAPORATION SYSTEMS, LLC, Conroe, TX (US)

(72) Inventor: Bruce Eshelman, Montgomery, TX (US)

(73) Assignee: WATER EVAPORATION SYSTEMS, LLC, Conroe, TX (US)

( * ) Notice: Subject to any disclaimer, the term of this patent is extended or adjusted under 35 U.S.C. 154(b) by 0 days.

(21) Appl. No.: 16/896,977

(22) Filed: Jun. 9, 2020

(51) Int. Cl.
| | |
|---|---|
| *B01D 1/14* | (2006.01) |
| *C02F 1/04* | (2006.01) |
| *C02F 9/00* | (2006.01) |
| *C02F 1/16* | (2006.01) |
| *B01D 1/00* | (2006.01) |
| *C02F 103/10* | (2006.01) |

(52) U.S. Cl.
CPC ............ *C02F 9/005* (2013.01); *B01D 1/0058* (2013.01); *B01D 1/14* (2013.01); *C02F 1/048* (2013.01); *C02F 1/16* (2013.01); *C02F 2103/10* (2013.01)

(58) Field of Classification Search
CPC ............ C02F 1/048; C02F 1/16; C02F 9/005; B01D 1/0058; B01D 1/14
See application file for complete search history.

(56) References Cited

U.S. PATENT DOCUMENTS

| | | | |
|---|---|---|---|
| 6,936,140 B2 * | 8/2005 | Paxton ................ | C02F 1/04 202/160 |
| 7,073,337 B2 * | 7/2006 | Mangin ................ | B01D 3/007 60/783 |
| 8,679,291 B2 * | 3/2014 | Duesel, Jr. ............ | B01D 1/305 159/2.1 |

(Continued)

OTHER PUBLICATIONS

Unknown author, Gas Fuel Metering Valve AGV10 for Light Industrial Gas Turbines, date of publication unknown, obtained from http://continentalcontrols.com/temp/literature/pdf/AGV%2010%20Revised.pdf on Jun. 8, 2020.

(Continued)

*Primary Examiner* — Jonathan Miller
(74) *Attorney, Agent, or Firm* — Basil M. Angelo; Angelo IP

(57) ABSTRACT

A method and system of wastewater evaporation uses a turbine-based wastewater evaporation system to convert wastewater to steam on the job site at or near the location where the wastewater is produced. The wastewater evaporation system includes a turbine system that heats wastewater within the turbine exhaust collector that is atomized and converted into steam in the presence of turbine exhaust within the turbine exhaust port for discharge. The system may be disposed on a mobile trailer to facilitate disposing on the job site and may be remotely controllable for use by a remote operator. Because the wastewater is disposed of on site, the method and system of wastewater evaporation does not require the use of storage, pipeline or trucking resources, (Continued)

SECTION A-A or disposal facilities, and potentially does not require on-site personnel, thereby reducing the costs associated with the disposal of produced wastewater and increasing the economic feasibility of exploration and production operations.

23 Claims, 13 Drawing Sheets

(56) References Cited

U.S. PATENT DOCUMENTS

| | | | | |
|---|---|---|---|---|
| 8,801,897 | B2* | 8/2014 | Duesel, Jr. | C02F 1/008 |
| | | | | 159/47.3 |
| 9,770,671 | B2* | 9/2017 | Curlett | B01D 53/92 |
| 10,441,894 | B2* | 10/2019 | Curlett | B01D 1/16 |
| 2006/0000355 | A1* | 1/2006 | Ogura | B01D 5/003 |
| | | | | 95/224 |
| 2011/0140457 | A1* | 6/2011 | Lakatos | B03D 1/245 |
| | | | | 290/1 R |
| 2011/0147195 | A1* | 6/2011 | Shapiro | C02F 1/441 |
| | | | | 203/10 |
| 2015/0157953 | A1* | 6/2015 | Duesel, Jr. | C02F 1/16 |
| | | | | 95/24 |
| 2016/0096743 | A1* | 4/2016 | Duesel, Jr. | C02F 1/048 |
| | | | | 159/47.3 |

OTHER PUBLICATIONS

Unknown author, Solar Turbines Incorporated, Solar Saturn Gas Turbine Generator Drive Application Control Package, date of publication unknown, obtained from https://petrotechinc.com/literature-library-files/gas-steam-turbines/solar-saturn-generator.pdf on Jun. 8, 2020.

Unknown author, Solar Turbines Incorporated, Turbomachinery Package Specification Saturn 20 Compressor Set and Mechanical Drive, 2009, obtained from https://pdf.directindustry.com/pdf/solar-turbines/saturn-20-cs-md-turbomachinery-package-specification/22650-199745.html on Jun. 8, 2020.

Unknown author, United States Environmental Protection Agency, Summary of Input on Oil and Gas Extraction Wastewater Management Practices Under the Clean Water Act, EPA-821-S19-001, May 2020, obtained from https://www.epa.gov/sites/production/files/2020-05/documents/oil-gas-final-report-2020.pdf on Jun. 8, 2020.

Unknown author, Valve Automation, Pneumatic Actuator HP-Series, date of publication unknown, obtained from https://www.meerza.com.my/wp-content/uploads/2016/08/HP-Catalog.pdf on Jun. 8, 2020.

* cited by examiner

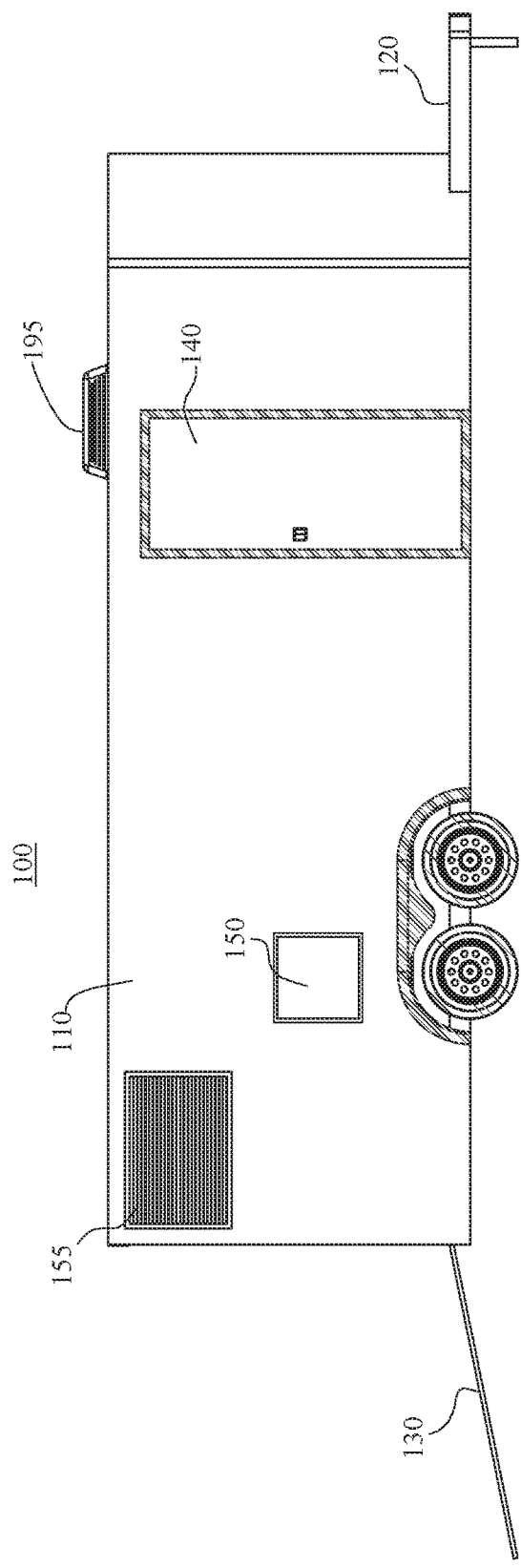
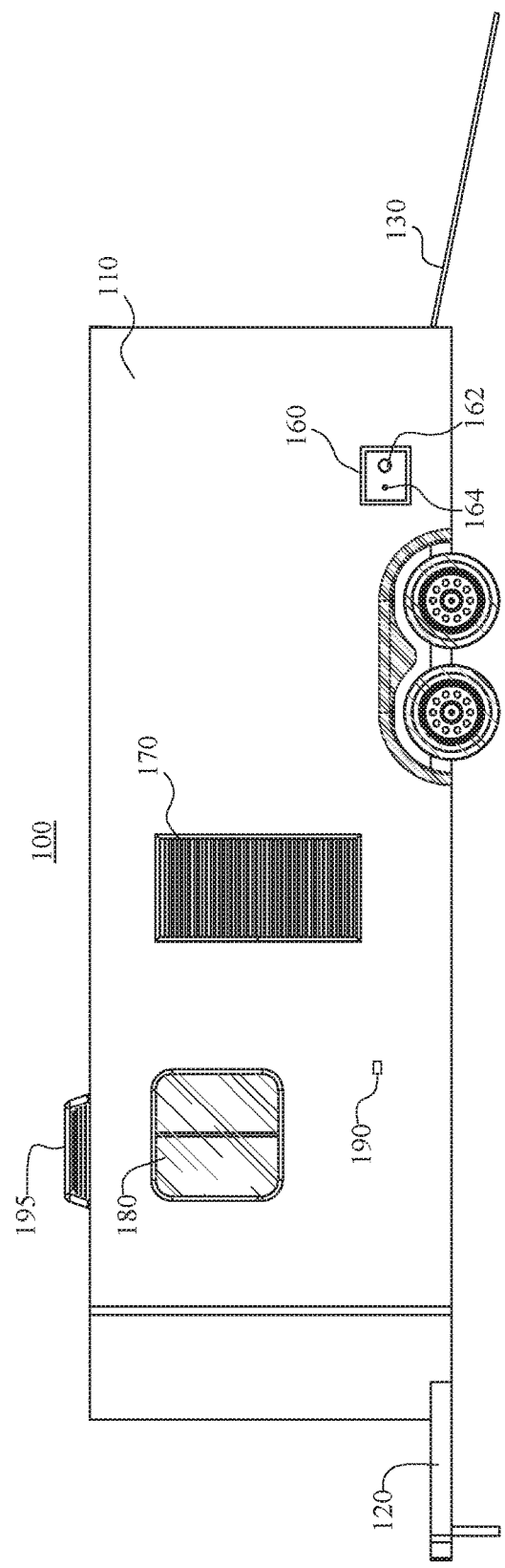
FIG. 1A
FIG. 1B

SECTION A-A

REMOTELY CONTROLLABLE MOBILE WASTEWATER EVAPORATION SYSTEM

BACKGROUND OF THE INVENTION

Hydraulic fracturing, commonly referred to as fracking, is a well-stimulation technique that fractures bedrock formations under high pressure to provide access to hydrocarbons disposed therein. Fracking is typically performed in formations composed of low permeability rock such as shale, sandstone, and sometimes coal. Fracking fluids are typically composed of water and one or more of sand, additives, and proppants that are injected into the formation under high pressure to create or enhance cracks in the bedrock formation to gain access to hydrocarbons. Shale reserves in the United State are believed to account for more than 80% of the world's total reserves and represent a staggering 5 trillion barrels of oil. As such, there has been a dramatic increase in domestic fracking operations and a corresponding increase in the volume of produced water, often referred to as wastewater, that must be properly disposed of. During fracking or conventional drilling processes, the majority of fluid returns, by volume, are wastewater. The returning water is separated from the hydrocarbons and solids and is either recycled for reuse or disposed of. During production operations, of a fractured or conventional well, there is also a substantial amount of wastewater. The ratio of wastewater to produced oil may be as high as 100 to 1 depending on the well, however, in the Permian Basin, 2 to 3 gallons of wastewater are produced for every gallon of oil produced. While the total volume of wastewater produced is not known, the fracking industry alone is believed to produce billions of gallons of wastewater each and every year that requires disposal in accordance with the law.

BRIEF SUMMARY OF THE INVENTION

According to one aspect of one or more embodiments of the present invention, a method of wastewater evaporation using a turbine may include fluidly communicating wastewater to a track inlet of a wastewater heating track disposed within an interior of an exhaust collector of the turbine, where the wastewater is heated by turbine exhaust in the interior of the exhaust collector while being fluidly communicated by the wastewater heating track to a track outlet from the wastewater heating track and fluidly communicating the heated wastewater from the track outlet to a plurality of wastewater atomization nozzles that direct atomized wastewater into an interior of an exhaust port of the turbine.

According to one aspect of one or more embodiments of the present invention, a system for wastewater evaporation may include a turbine having an exhaust collector and an exhaust port, a wastewater heating track disposed within an interior of the exhaust collector, where a track inlet to the wastewater heating track receives wastewater that is heated by turbine exhaust in the interior of the exhaust collector while being fluidly communicated by the wastewater heating track to a track outlet from the wastewater heating track, and a plurality of wastewater atomization nozzles that atomize wastewater from the wastewater heating track into an interior of the exhaust port. The atomized wastewater may be converted to steam in the presence of turbine exhaust in the exhaust port of the turbine.

According to one aspect of one or more embodiments of the present invention, a mobile wastewater evaporation system includes a mobile trailer having an exterior wastewater inlet connector, a turbine having an exhaust collector disposed within the mobile trailer and an exhaust port configured to convey turbine exhaust out of an exhaust window of the mobile trailer, a wastewater heating track disposed within an interior of the exhaust collector, where a track inlet to the wastewater heating track receives wastewater that is heated by turbine exhaust in the interior of the exhaust collector while being fluidly communicated by the wastewater heating track to a track outlet from the wastewater heating track, a plurality of wastewater atomization nozzles that direct atomized wastewater into an interior of the exhaust port, where the atomized wastewater is converted to steam in the presence of turbine exhaust in the exhaust port of the turbine, and a control system that controls operation of the turbine.

Other aspects of the present invention will be apparent from the following description and claims.

BRIEF DESCRIPTION OF THE DRAWINGS

FIG. 1A shows a left-side exterior elevation view of a mobile wastewater evaporation system in accordance with one or more embodiments of the present invention.

FIG. 1B shows a right-side exterior elevation view of a mobile wastewater evaporation system in accordance with one or more embodiments of the present invention.

DETAILED DESCRIPTION OF THE INVENTION

Figure 2A:
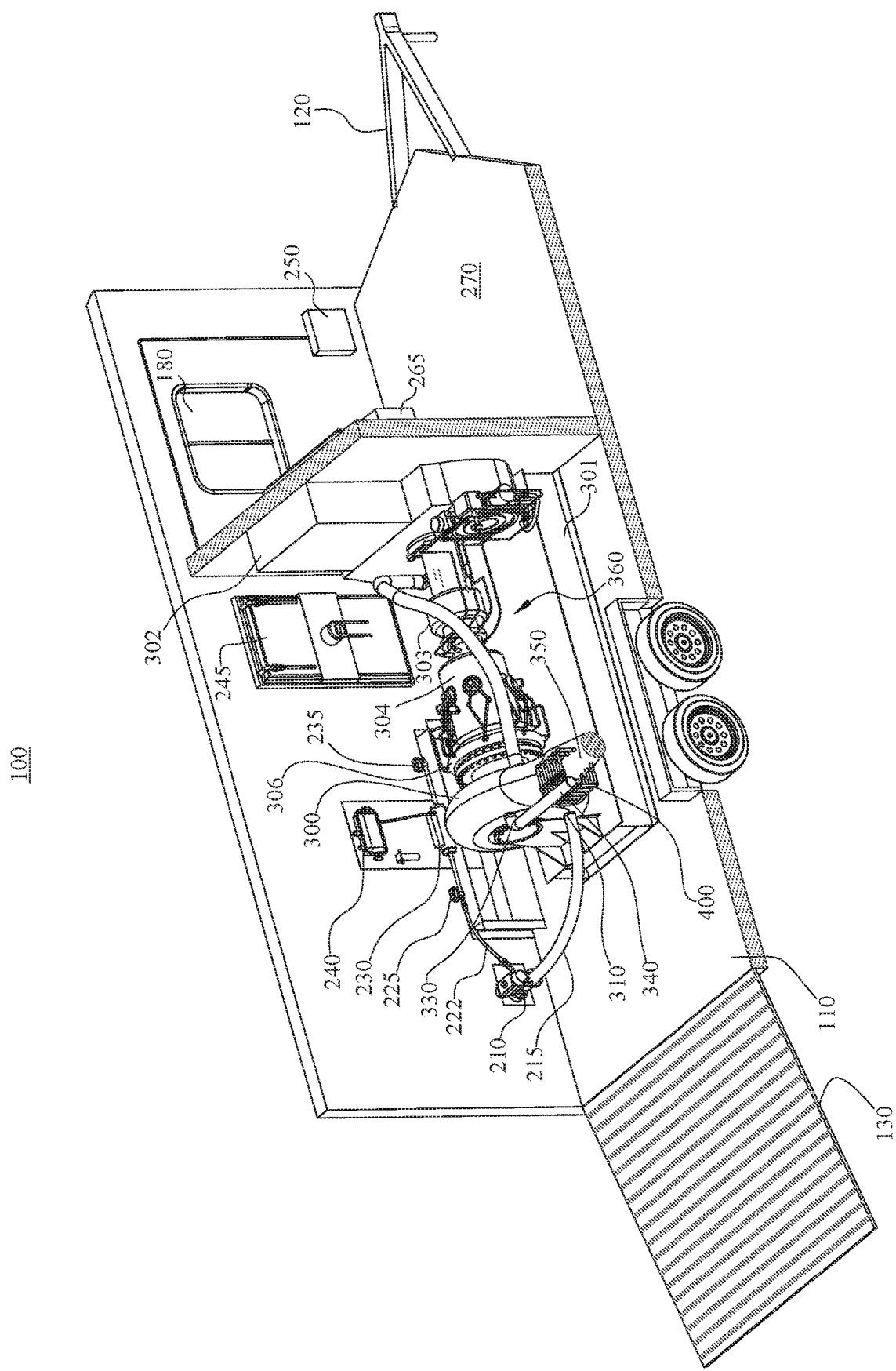
FIG. 2A shows a left-side rear-facing interior perspective view of a mobile wastewater evaporation system in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth to provide a thorough understanding of the present invention. In other instances, well-known features to those of ordinary skill in the art are not described to avoid obscuring the description of the present invention.

A longstanding issue in the oil and gas industry is how to properly dispose of significant volumes of wastewater in accordance with law. For the purpose of this disclosure, wastewater means any water produced as part of fracking or conventional drilling operations, sometimes referred to in the industry as flowback water, and any water produced as part of production operations, sometimes referred to in the industry as produced water. However, one of ordinary skill in the art will recognize that wastewater may refer to any water that requires of disposal, including wastewater produced by other applications outside of the oil and gas industry, in accordance with one or more embodiments of the present invention. The vast majority of wastewater produced as part of exploration and production operations is disposed of by injecting it underground in an off-site disposal well. The wastewater is typically transported by pipeline or truck to an off-site location where it is injected deep underground in a dedicated disposal well. However, underground injection is not geologically feasible in all areas and remains controversial for a number of reasons. The chemistry of produced wastewater is not well characterized and varies from well to well, and injection underground potentially contaminates or fouls other water resources. In addition, there is concern that injection contributes to increased seismic activity causing earthquakes in areas where earthquakes are not normally experienced. Alternatively, wastewater is transferred off-site and disposed of by a centralized wastewater disposal facility that serves as a disposal site for a number of operations. The wastewater is typically transported by pipeline or truck to the centralized wastewater disposal facility where the wastewater is treated and recycled for reuse in drilling operations or treated for industrial, agricultural, or municipal use. Some centralized wastewater disposal facilities dispose of wastewater through evaporation, discharge over surface wasters, or underground injection into disposal wells.

As such, the current state of the art in the oil and gas industry is to dispose of wastewater off site, incurring costs for intermediate on-site storage, pipeline or trucking resources to transport the wastewater off-site, off-site storage, and off-site disposal, the costs of which may vary depending on the volume, distances involved, and means of disposal. Because of the volume of wastewater produced, these costs are substantial, increase the overall cost of operations, and are a factor in the economic feasibility of operations. In an oil and gas industry that has and continues to experience significant pricing pressure, costs must be controlled in order to make the exploration and production of hydrocarbons not only economically feasible, but competitive and profitable. While pricing of produced oil is beyond the control of operators and drillers, the ability to control costs, including those related to the disposal of wastewater, is critical to the economic feasibility of ongoing exploration and production operations.

Accordingly, in one or more embodiments of the present invention a method and system for wastewater evaporation enables the disposal of wastewater on-site at the location where the wastewater is produced. A mobile and optionally remotely controllable wastewater evaporation system may be used to evaporate wastewater on location, potentially without on-site personnel, and direct the wastewater steam over an evaporation pond or pit which, upon completion of operations, may be reclaimed in an environmentally conscious manner. Advantageously, the method and system for wastewater evaporation does not require the use of storage, pipeline or trucking resources, or disposal facilities, and potentially does not require on-site personnel, thereby substantially reducing the costs associated with the disposal of produced wastewater and increasing the economic feasibility of exploration and production operations.

FIG. 1A shows a left-side exterior elevation view of a mobile wastewater evaporation system 100 in accordance with one or more embodiments of the present invention. A mobile wastewater evaporation system 100 may include an integrated or towable housing that facilitates locating a wastewater evaporation system (not independently illustrated) on-site to dispose wastewater at or near the location where it is being produced. In certain embodiments, the mobile wastewater evaporation system 100 may include a mobile trailer 110 that houses the components of the wastewater evaporation system (not shown). The mobile trailer 110 may include a trailer hitch 120 that permits the mobile trailer 110 to be towed onto the job site by a light duty truck and, in certain embodiments, be left on site for remote operation. Notwithstanding, one of ordinary skill in the art will recognize that any type or kind of mobile housing, integrated with a vehicle or capable of being towed onto the job site, may be used in accordance with one or more embodiments of the present invention. Mobile trailer 110 may further include a rear-access ramp 130 that facilitates access to a turbine area (not shown) of the mobile trailer 110 and a side-access door 140 that facilitates access to an interior of the mobile trailer 110, in certain embodiments, to a control room (not shown) of the mobile wastewater evaporation system 100. Mobile trailer 110 may further include an exhaust window 150 for discharging turbine exhaust and wastewater steam (not shown), an exhaust fan 155 for the turbine area (not shown), and an optional air conditioner 195 for the optional control room (not shown).

Continuing, FIG. 1B shows a right-side exterior elevation view of a mobile wastewater evaporation system 100 in accordance with one or more embodiments of the present invention. Mobile trailer 110 may further include a connection interface 160 to facilitate external connections to the system 100. Connection interface 160 may include an exterior wastewater inlet connector 162 for connecting an exterior wastewater hose (not shown) that fluidly communicates wastewater to the system 100 and an exterior fuel inlet connector 164 for connecting an exterior fuel hose (not shown) that fluidly communicates fuel to the turbine system (not shown). Mobile trailer 110 may further include an oil cooling system 170 that cools the oil used to lubricate the turbine system (not shown). The optional control room (not shown) or turbine area (not shown) may include one or more windows 180. In the embodiment depicted, window 180 is disposed on the same side as the connection interface 160 such that an operator in the optional control room (not shown) may have visibility to the source of wastewater via wastewater inlet connector 162 or fuel via fuel inlet connector 164. Mobile trailer 110 may further include one or more electrical interfaces 190 that either input electrical power to the control systems (not shown) of the system 100 or provide an outlet for other electrically powered equipment. Notwithstanding, one of ordinary skill in the art will recognize that system 100 may require a source of electrical power, either via connection interface 190 or otherwise, that powers the control systems (not shown) that operate the turbine (not shown) of the mobile wastewater evaporation system 100. One of ordinary skill in the art will appreciate that the placement and location of vents, portals, windows, fans, doors, and ramps may vary based on an application or design in accordance with one or more embodiments of the present invention.

FIG. 2A shows a left-side rear-facing interior perspective view of a mobile wastewater evaporation system 100 in accordance with one or more embodiments of the present invention. Mobile wastewater evaporation system 100 may be disposed in a mobile trailer 110 that facilitates locating the system 100 on a desired job site. Mobile trailer 110 may house a wastewater evaporation turbine system 360 and may optionally include a control room 270 that houses equipment used to control the operation of the mobile wastewater evaporation system 100.

In the embodiment shown, the wastewater evaporation turbine system 360 is a Solar® Saturn® gas-fueled turbine modified as discussed herein. While merely exemplary, one of ordinary skill in the art will appreciate that any light industrial gas-fueled turbine system may be used in accordance with one or more embodiments of the present invention. The mechanical drive package may include an air intake 302, a compressor 303, a combustor 304, and a turbine drive 306, disposed on a moveable skid 301. The turbine drive 306 typically includes two or three turbine wheels/blades (not shown) that spin as a result of the high temperature and high pressure combustion of the combustor stage 304, drawing more pressurized air into the combustor 304 and spinning an optional generator (not shown) that converts the rotational energy of the turbine wheels (not shown) into electrical energy. In the exemplary Solar® Saturn® gas-fueled turbine modified as discussed herein, the turbine wheels may rotate as high 22,300 times per minute. One or more of the turbine wheels (not shown) may optionally be removed to enhance the generation of heat within the turbine exhaust collector 300. In certain embodiments, the turbine system 360 may be operated with no-load for wastewater evaporation applications. In this context, no-load means the turbine system 360 may be run without a load for the sole purpose of generating hot turbine exhaust that evaporates wastewater. In other embodiments, the turbine system 360 may generate electrical power that may be used to at least partially power the electrically powered components of the system 100. In still other embodiments, the turbine system 360 may be configured for use with any other type or kind of turbine-driven load. One of ordinary skill in the art, having the benefit of this disclosure, will recognize that wastewater evaporation turbine system 360 may be any type or kind of industrial turbine having a turbine exhaust collector 300 capable of housing a wastewater heating track (not shown) within the turbine exhaust collector 300.

An exterior fuel inlet connector (e.g., 164 of FIG. 1B) of mobile trailer 110 may be fluidly connected to a first fuel cutoff valve 225 via an interior fuel hose 222. First fuel cutoff valve 225 may be fluidly connected to a fuel metering valve 230 that meters the delivery of fuel to the turbine system 360. In certain embodiments, fuel metering valve 230 may be, for example, an AGV10® gas fuel metering valve by Continental Controls Corporation®. One of ordinary skill in the art will recognize that other gas fuel metering valves may be used in accordance with one or more embodiments of the present invention. Fuel metering valve 230 may be fluidly connected to a second fuel cutoff valve 235. Second fuel cutoff valve 235 may be fluidly connected to the turbine system 360, providing metered fuel for the turbine system 360. Fuel metering valve 230 may be controlled by a fuel control system 240 that adjusts the throttling orifice to change fuel flow as necessary to ensure that the metered fuel flow equals fuel demand of the turbine system 360. A lubricating oil system 245 may provide lubricants used to lubricate the moving parts of the turbine system 360. In one or more embodiments of the present invention, the exemplary turbine system 360 may be powered by natural gas provided via an external source fluidly connected to the exterior fuel inlet connector (e.g., 164 of FIG. 1B). In certain embodiments, the turbine system 360 may be powered by flare gas generated on-site during fracking, drilling, or production operations.

During the combustion process of the turbine system 360, air is drawn into the turbine air intake 302 and is compressed by the multi-stage compressor 303. The compressed air is directed into the annular combustion chamber (not shown) of the combustor 304 at a steady flow rate. Fuel (not shown) is injected and mixed with compressed air and ignited. So long as there is a continuous flow of pressurized air and fuel, combustion will remain substantially continuous. Hot pressurized gas from the combustor 304 expands through and drives 306 the turbine wheels (not shown). The combustion process typically requires at least 25 percent of the total air it compresses. The excess air is mixed with combustion products and forms turbine exhaust that is collected in the turbine exhaust collector 300 and vented via the turbine exhaust port 350. Wastewater, fluidly communicated via an exterior wastewater inlet connector (e.g., 162 of FIG. 1B), may be regulated by an actuator 210, such as, for example, an HP Series® pneumatic actuator by HKC Co., Ltd.® One of ordinary skill in the art will recognize that other actuators may be used in accordance with one or more embodiments of the present invention. Wastewater may be fluidly communicated from actuator 210 to an optional wastewater inlet connection 310 via an interior wastewater hose 215. The optional wastewater inlet connection 310 may be fluidly connected to a wastewater heating track inlet (e.g., 370 of FIG. 3A) of a wastewater heating track (e.g., 375, 380, 385 of FIG. 3A). The optional wastewater inlet connection 310 may be a connection mechanism that facilitates connecting interior wastewater hose 215 to the wastewater heating track inlet (e.g., 370 of FIG. 3A), but may not be required in certain applications or designs where the interior wastewater hose 215 connects directly to the wastewater heating track inlet (e.g., 370 of FIG. 3A). The wastewater heating track inlet (e.g., 370 of FIG. 3A) fluidly communicates wastewater through the wastewater heating track (e.g., 375, 380, 385 of FIG. 3A) disposed within the turbine exhaust collector 300. As wastewater is communicated through the wastewater heating track outlet (e.g., 365 of FIG. 3A), turbine exhaust in the turbine exhaust collector 300 heats the wastewater disposed within the wastewater heating track. (e.g., 375, 380, 385 of FIG. 3A). Heated wastewater exits the wastewater heating track outlet (e.g., 365 of FIG. 3A) of the wastewater heating track (e.g., 375, 380, 385 of FIG. 3A) and may be fluidly communicated from an optional wastewater outlet connection 330 to a wastewater manifold 340. The optional wastewater outlet connection 330 may be a connection mechanism that facilitates connecting the wastewater heating track outlet (e.g., 365 of FIG. 3A) to the wastewater manifold 340, but may not be required in certain applications or designs where the wastewater heating track outlet (e.g., 365 of FIG. 3A) connects directly to the wastewater manifold 340. Wastewater manifold 340 may fluidly communicate heated wastewater, via a plurality of fixed or flexible conduits 400, to a plurality of wastewater atomization nozzles (e.g., 410 of FIG. 3A). The plurality of wastewater atomization nozzles (e.g., 410 of FIG. 3A) may be at least partially disposed within the turbine exhaust port 350, such that atomized wastewater (not shown) may be directed into the interior of the turbine exhaust port 350 and is converted to steam in the presence of hot turbine exhaust flowing out of the turbine exhaust port 350. The wastewater steam and turbine exhaust may be directed away from the system 100. For serviceability of the wastewater atomization nozzles 410 that may require service or replacement, wastewater manifold 140 may be used to convey wastewater from the exhaust collector 300 to the turbine exhaust port 350 for atomization and conversion into steam. The location of the wastewater atomization nozzles 410 may be readily accessible and easily serviced or replaced. However, one of ordinary skill in the art will recognize that wastewater manifold 140 may be optional in certain embodiments and the heating and atomization may take place entirely within the exhaust collector 300 or the exhaust collector 300 and turbine exhaust port 350 in accordance with one or more embodiments of the present invention.

Figure 2B:
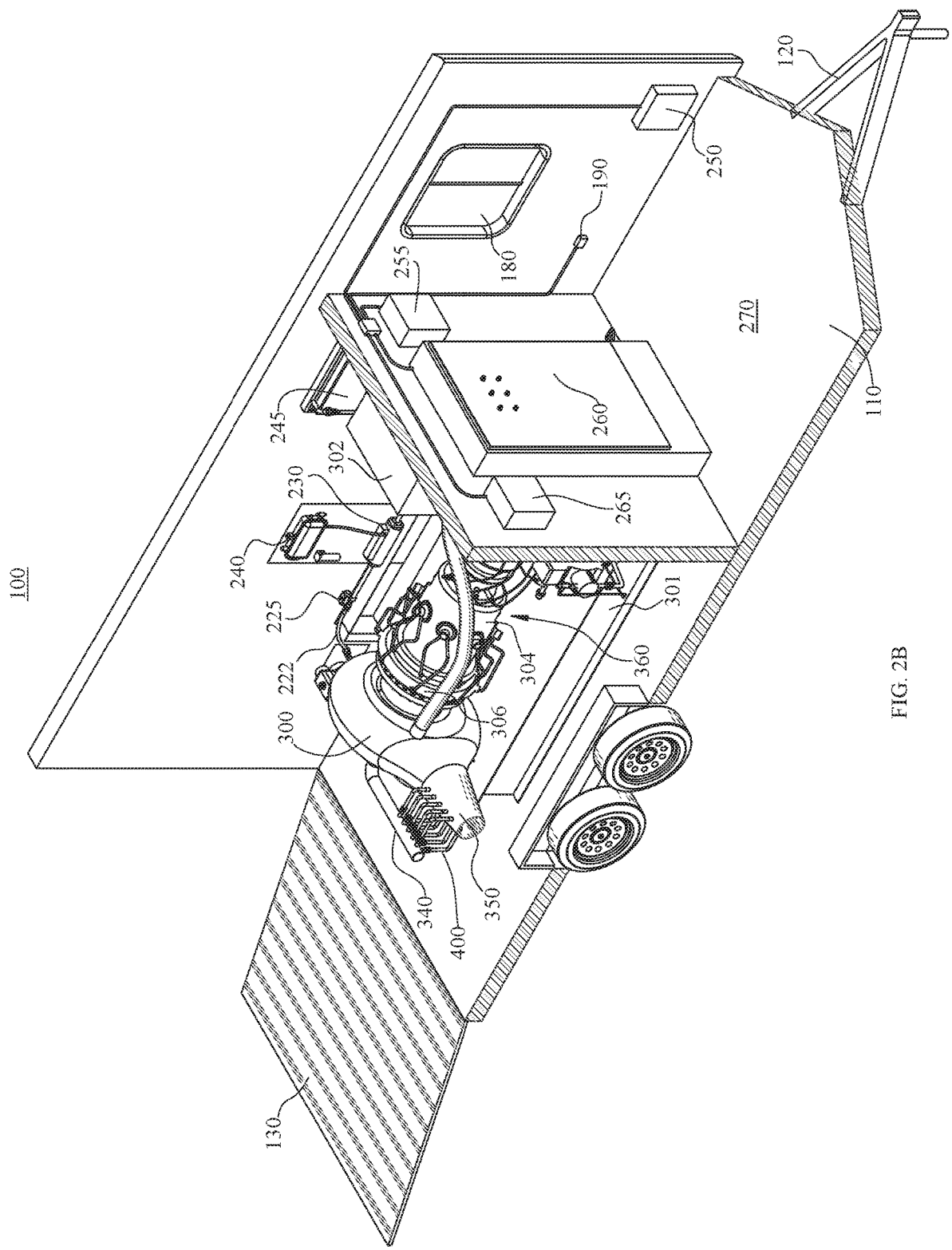
FIG. 2B shows a right-side front-facing interior perspective view of a mobile wastewater evaporation system in accordance with one or more embodiments of the present invention.
Figure 2C:
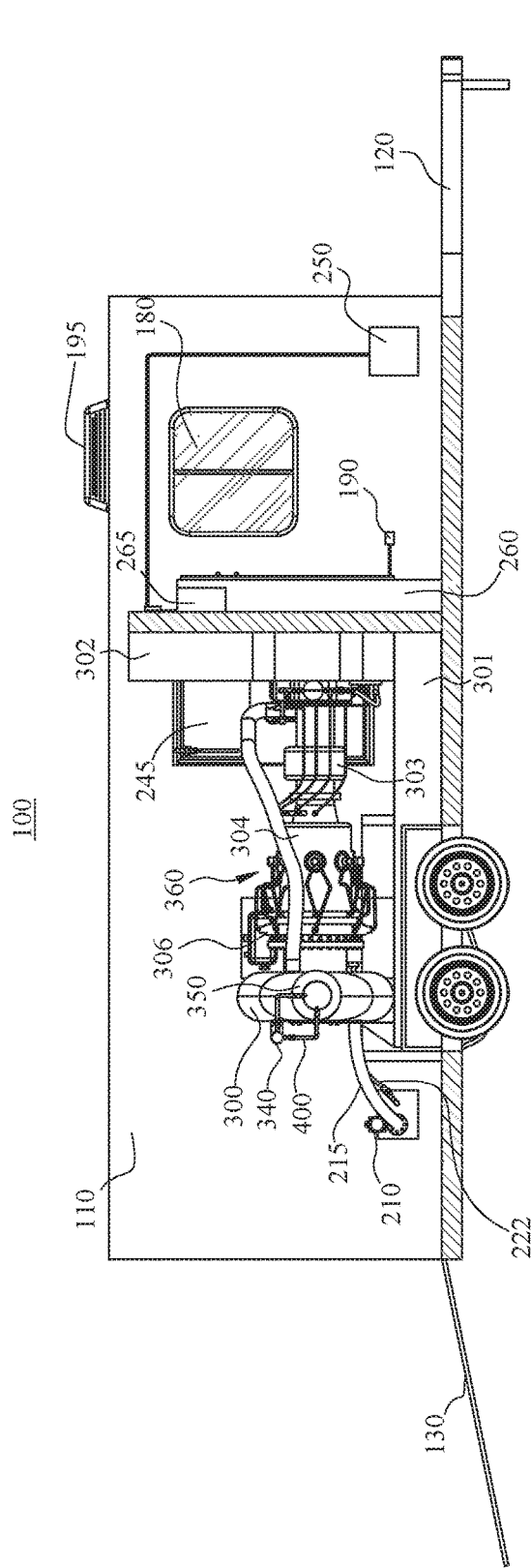
FIG. 2C shows a left-side interior elevation view of a mobile wastewater evaporation system in accordance with one or more embodiments of the present invention.
Figure 2D:
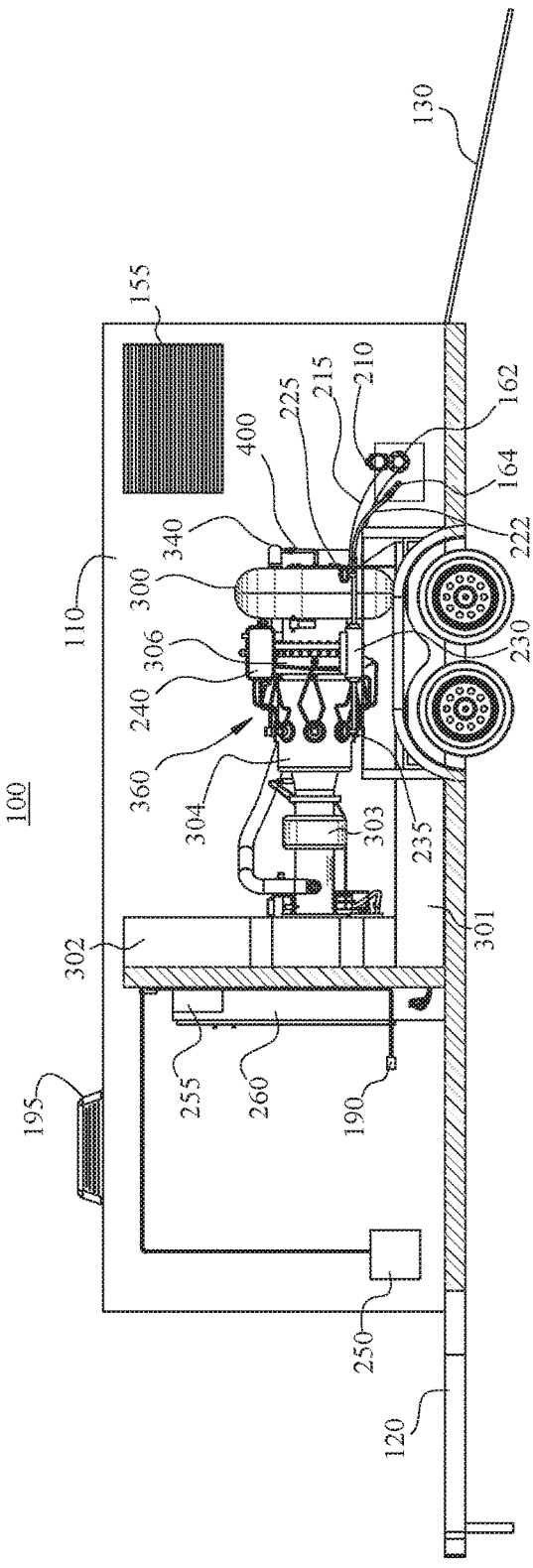
FIG. 2D shows a right-side interior elevation view of a mobile wastewater evaporation system in accordance with one or more embodiments of the present invention.
Figure 2E:
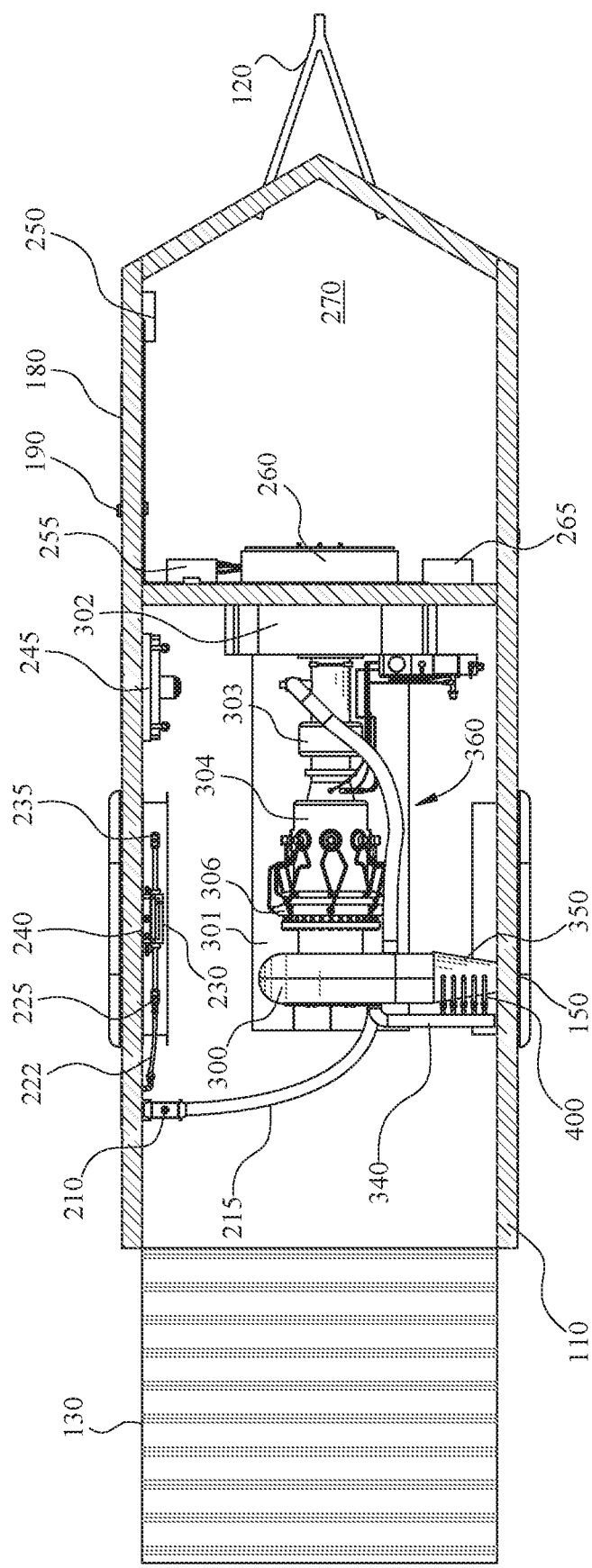
FIG. 2E shows a top interior plan view of a mobile wastewater evaporation system in accordance with one or more embodiments of the present invention.

Continuing, FIG. 2B shows a right-side front-facing interior perspective view of a mobile wastewater evaporation system 100 in accordance with one or more embodiments of the present invention. The optional control room 270 may house one or more electrically powered components that govern operation of the turbine system 360. An electrical service panel 250 may serve as the input of electrical power, via on-site electrical service drop (not shown), externally powered generator (not shown), or electrical power provided by an optional generator (not shown) of the turbine system 360. An optional battery backup system 255 may be included to ensure the continuity of operations when working with less than ideal electrical power quality and service. A computer or Programmable Logic Controller ("PLC") 260 may be used to control various 24 $V_{DC}$ systems of the turbine system 360. For example, PLC 260 may include one or more controls that are made available to an on-site operator, including, for example, a control system power button, a turbine start button, a turbine stop button, a turbine reset button, a turbine detergent wash button, a turbine speed control knob, or controls for the mechanical drive. In addition, the one or more controls may optionally be made available to a remote operator via a network connection such as, for example, a fixed network connection (not shown), a cellular network connection (not shown), or a satellite network connection (not shown). In such embodiments, once the mobile wastewater evaporation system 100 is be disposed on the job site and fully connected to sources of fuel and wastewater, operation of the system 100 may be fully remotely controllable, via a remote operator with a software application, without any on site personnel. In certain embodiments, system 100 may further include a PLC 265 that may be used to control the operation of various AC powered systems including, for example, the AC powered water pumps (not shown) and exhaust fan (e.g., 155 of FIG. 1A). Continuing, FIG. 2C shows a left-side interior elevation view of a mobile wastewater evaporation system 100 in accordance with one or more embodiments of the present invention. Continuing, FIG. 2D shows a right-side interior elevation view of a mobile wastewater evaporation system 100 in accordance with one or more embodiments of the present invention. Continuing, FIG. 2E shows a top interior plan view of a mobile wastewater evaporation system 100 in accordance with one or more embodiments of the present invention.

Figure 3A:
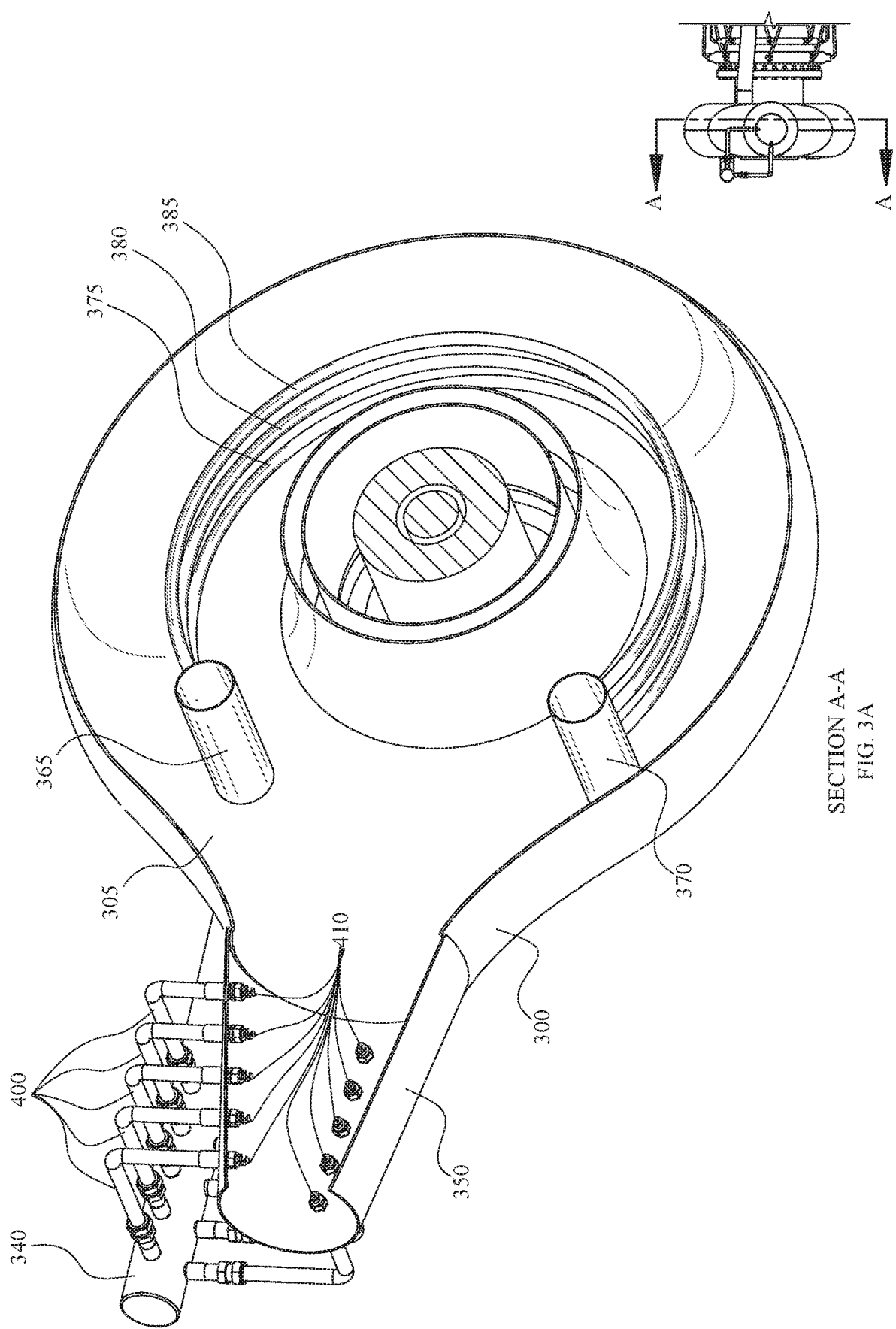
FIG. 3A shows a cross-sectional perspective view of a portion of a turbine exhaust collector and a wastewater heating track disposed within the interior of the turbine exhaust collector in accordance with one or more embodiments of the present invention.
Figure 3B:
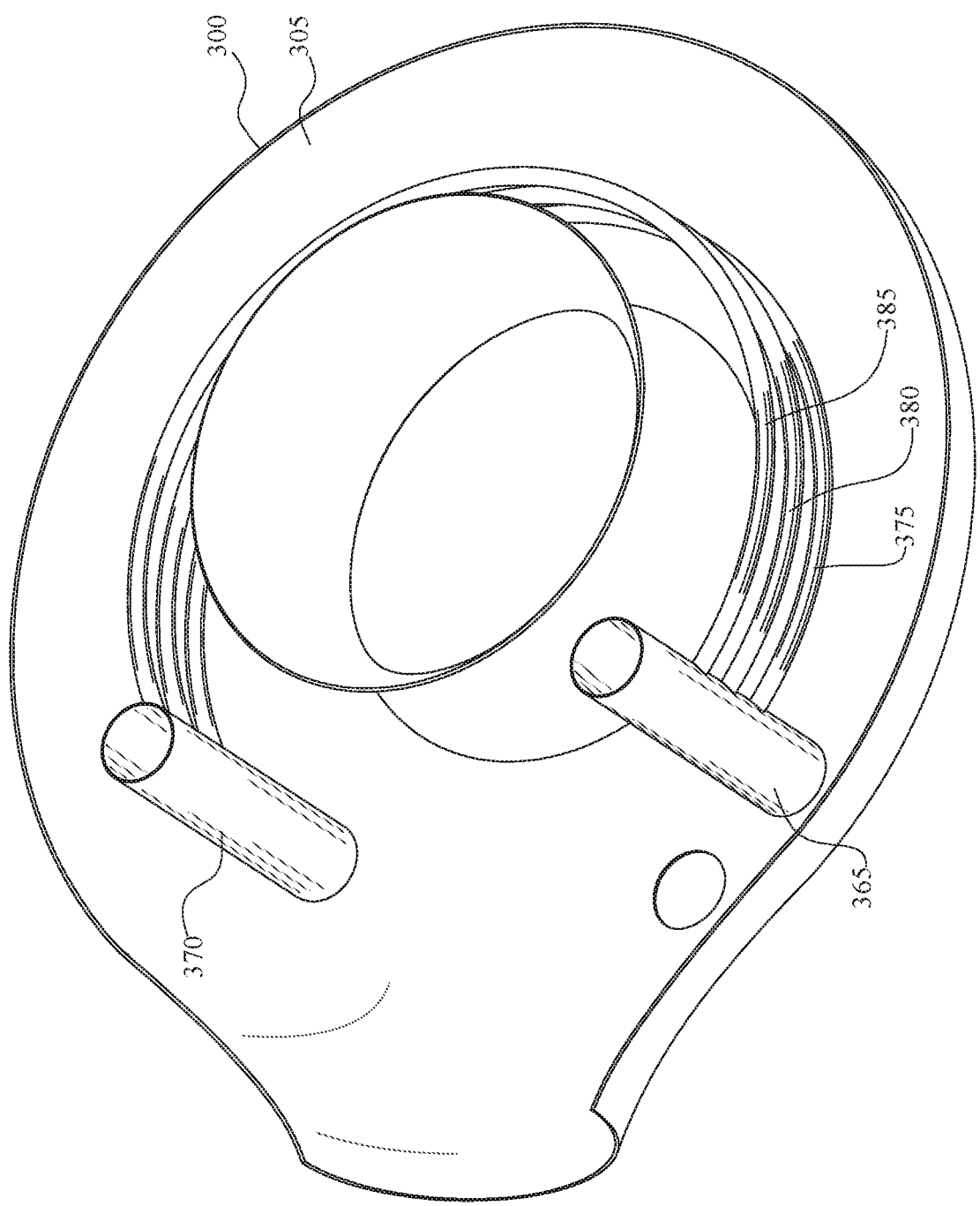
FIG. 3B shows a cross-sectional perspective view of a portion of a turbine exhaust collector and a wastewater heating track disposed within the interior of the turbine exhaust collector in accordance with one or more embodiments of the present invention.

FIG. 3A shows a cross-sectional perspective view of a portion of a turbine exhaust collector 300 and a wastewater heating track (e.g., 375, 380, 385) disposed within the interior 305 of the turbine exhaust collector 300 in accordance with one or more embodiments of the present invention. As noted above, the interior wastewater hose (e.g., 215) may be fluidly connected to the optional wastewater inlet connection (e.g., 310) to the wastewater heating track inlet 370. The wastewater heating track inlet 370 may fluidly communicate wastewater to the wastewater heating track outlet 365 via the wastewater heating track (e.g., 375, 380, 385). The wastewater heating track may include one or more wastewater pipe segments (e.g., 375, 380, 385) that are disposed within the interior 305 of the turbine exhaust collector 300. In certain embodiments, the one or more pipe segments (e.g., 375, 380, 385) of the wastewater heating track may be composed of stainless steel. In other embodiments, the one or more pipe segments (e.g., 375, 380, 385) may be composed of copper, aluminum, or brass. In still other embodiments, the one or more pipe segments (e.g., 375, 380, 385) may be composed of an alloy having a high degree of thermal conductivity. One of ordinary skill in the art will recognize that any metal, alloy, or synthetic material having a high degree of thermal conductivity may be used in accordance with one or more embodiments of the present invention.

During operation of the turbine system 360, the wastewater heating track (e.g., 375, 380, 385) may be surrounded by hot turbine exhaust within the interior 305 of the turbine exhaust collector 300 that heats the wastewater conveyed therein. Depending on the type or kind of turbine, the temperature of the turbine exhaust within the turbine exhaust collector 300 may be in a range between 500° F. and 1,000° F., with increased steam conversion efficiency at higher temperature. With the objective of maximally heating the wastewater conveyed by the wastewater heating track, the one or more pipe segments (e.g., 375, 380, 385) may have a size, shape, and number of pipe segments that convey wastewater in the flow path of hot turbine exhaust and maximally heat the wastewater conveyed therein. One of ordinary skill in the art will recognize that one or more pipe segments (e.g., 375, 380, 385) having a smaller diameter may more uniformly heat the wastewater conveyed therein than a larger diameter pipe segment, thereby increasing the efficiency of conversion to steam. One of ordinary skill in the art will also recognize that the size, shape, and number of pipe segments (e.g., 375, 380, 385), as well as their location within the turbine exhaust collector 300, may vary based on an application or design in accordance with one or more embodiments of the present invention. Heated wastewater may be conveyed from the wastewater heating track (e.g., 375, 380, 385) to the optional wastewater heating track outlet 365. The wastewater heating track outlet 365 may be fluidly connected to a wastewater manifold 340 directly or via an optional wastewater outlet connection 330 that may be integrated with the wastewater manifold 340 or excluded if not required. Heated wastewater may be conveyed from the wastewater manifold 340 to the interior of the turbine exhaust port 350 via a plurality of fixed or flexible conduits 400.

Figure 4C:
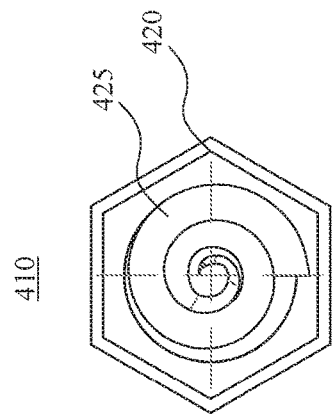
FIG. 4C shows a top plan view of a wastewater atomization nozzle in accordance with one or more embodiments of the present invention.
Figure 4D:
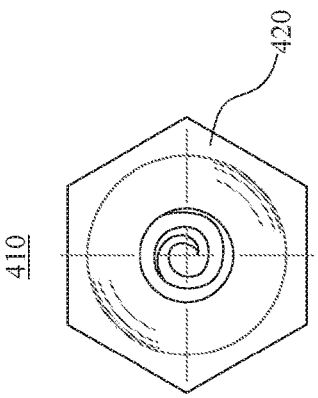
FIG. 4D shows a bottom plan view of a wastewater atomization nozzle in accordance with one or more embodiments of the present invention.
Figure 4A:
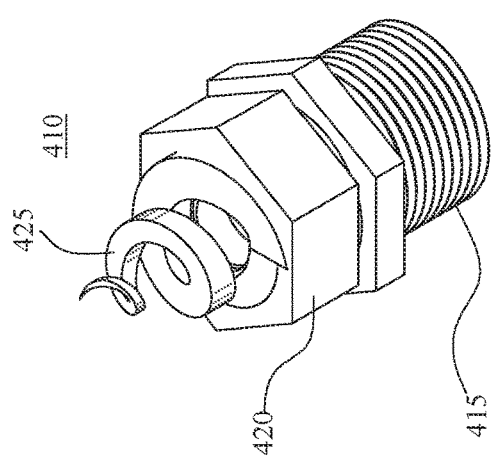
FIG. 4A shows a top-facing perspective view of a wastewater atomization nozzle in accordance with one or more embodiments of the present invention.
Figure 4B:
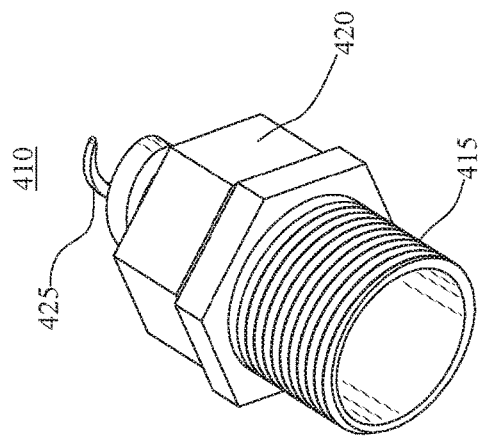
FIG. 4B shows a bottom-facing perspective view of a wastewater atomization nozzle in accordance with one or more embodiments of the present invention.
Figure 4E:
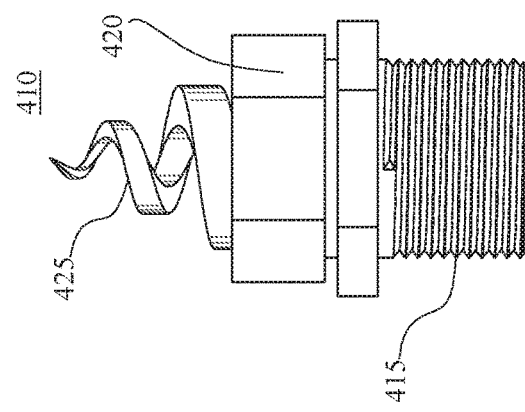
FIG. 4E shows a front elevation view of a wastewater atomization nozzle in accordance with one or more embodiments of the present invention.
Figure 4F:
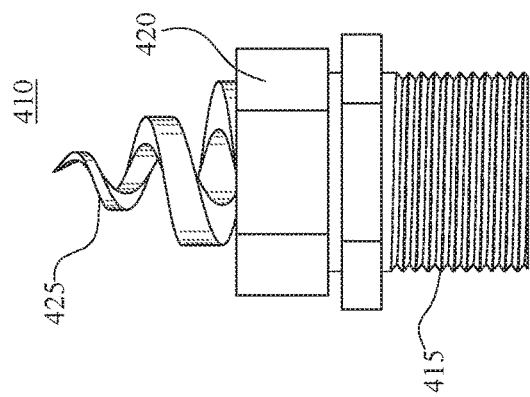
FIG. 4F shows a rear elevation view of a wastewater atomization nozzle in accordance with one or more embodiments of the present invention.
Figure 4G:
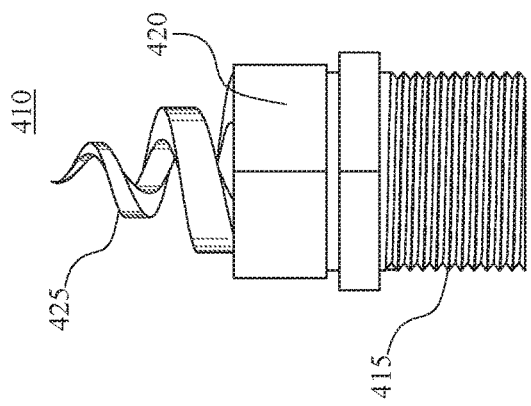
FIG. 4G shows a right-side elevation view of a wastewater atomization nozzle in accordance with one or more embodiments of the present invention.
Figure 4H:
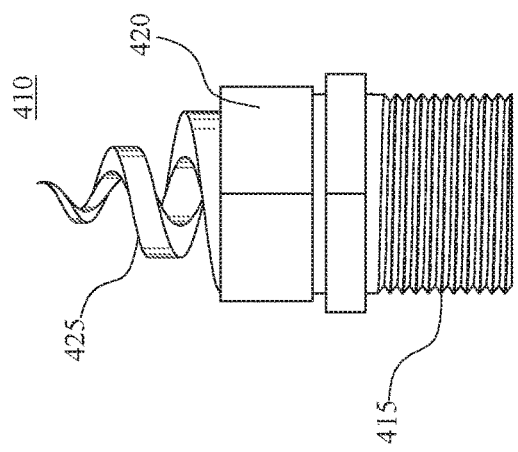
FIG. 4H shows a left-side elevation view of a wastewater atomization nozzle in accordance with one or more embodiments of the present invention.
Figure 5A:
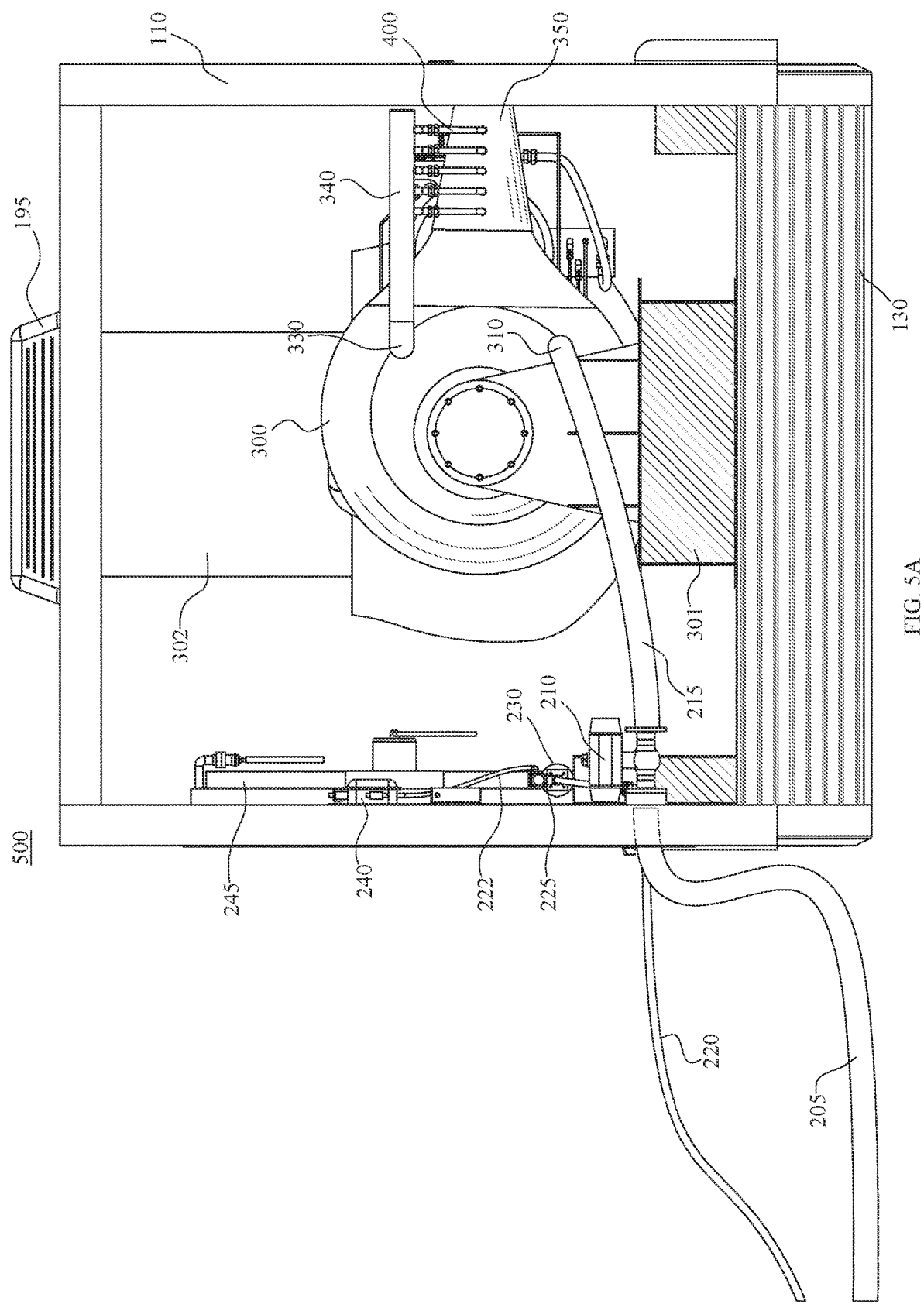
FIG. 5A shows a rear elevation view of a wastewater evaporation system in operative use in accordance with one or more embodiments of the present invention.
Figure 5B:
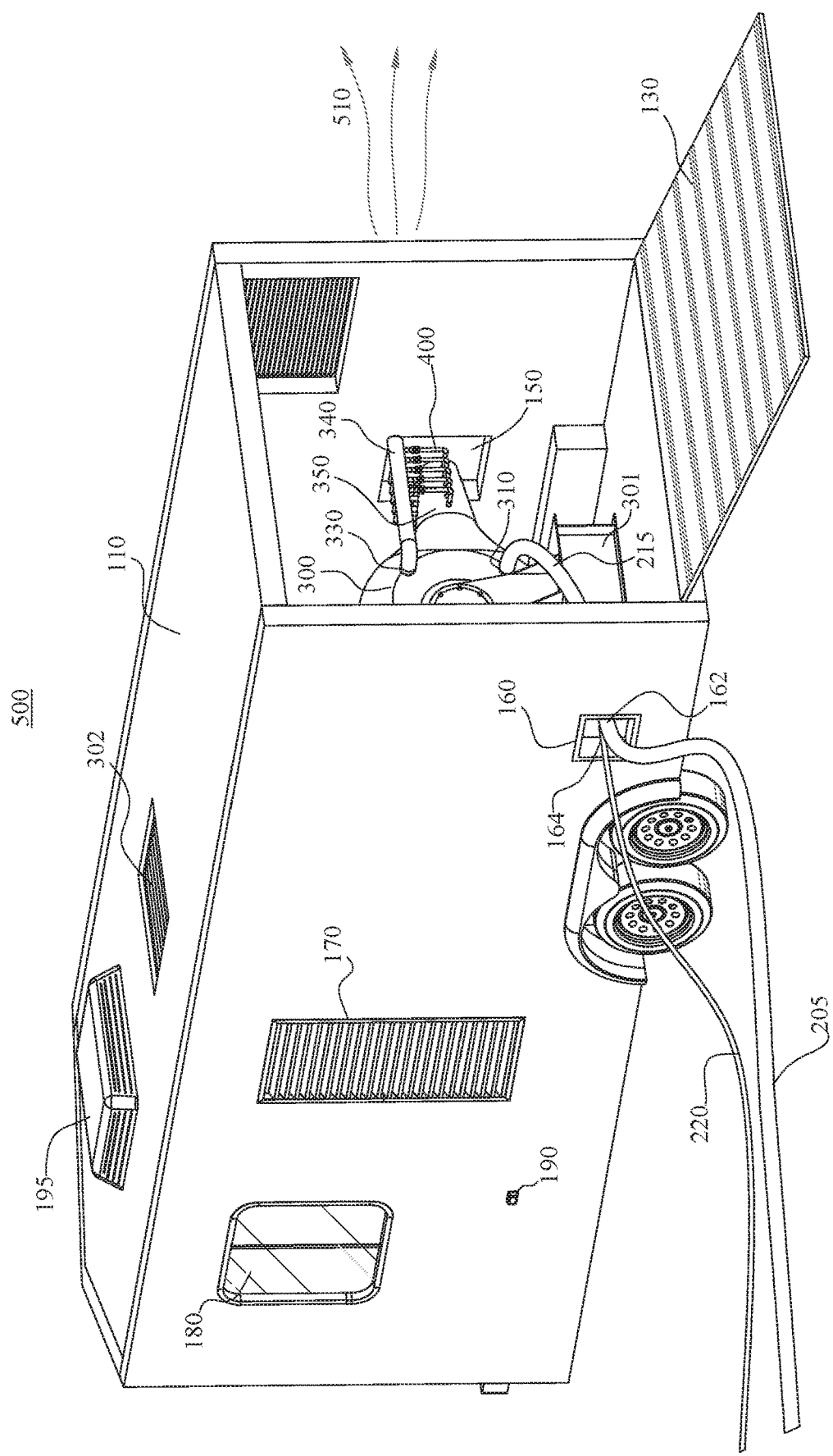
FIG. 5B shows a right-side perspective view of a wastewater evaporation system in operative use in accordance with one or more embodiments of the present invention.
Figure 5C:
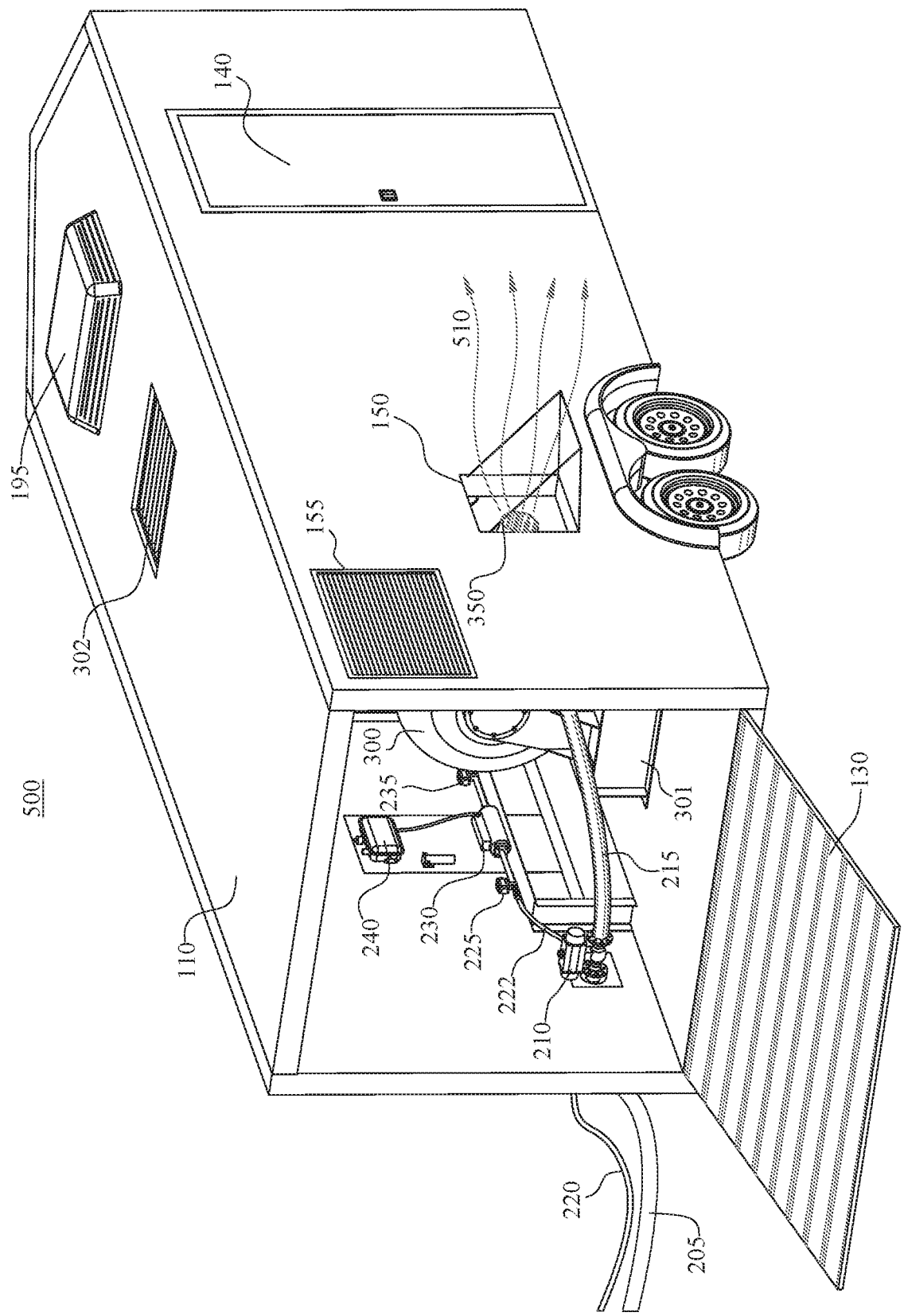
FIG. 5C shows a right-side perspective view of a wastewater evaporation system in operative use in accordance with one or more embodiments of the present invention.

The plurality of conduits 400 may be fluidly connected to a plurality of wastewater atomization nozzles 410 that are at least partially disposed within the interior of the turbine exhaust port 350. The wastewater atomization nozzles 410 may be oriented such that their atomization tips (e.g., 425 of FIG. 4A) are directed towards the interior of the turbine exhaust port 350. The location and pattern of arrangement of the wastewater atomization nozzles 410 may be distributed about the turbine exhaust port 350 to maximize efficiency. In certain embodiments, the pattern of arrangement of the plurality of wastewater atomization nozzles 410 may be arranged in a fixed pattern as shown in FIG. 3A. In other embodiments, the pattern of arrangement of the plurality of wastewater atomization nozzles 410 may be arranged in a Fibonacci spiral (not shown) about the turbine exhaust port 350. One of ordinary skill in the art will recognize that the location and pattern of arrangement of the plurality of wastewater atomization nozzles 410 may vary based on an application or design in accordance with one or more embodiments of the present invention. One of ordinary skill in the art will also recognize that the size, shape, and number of atomization nozzles 410 may vary based on application or design.

The heated wastewater may be atomized by the plurality of wastewater atomization nozzles 410 and converted to steam, if not already steam, in the presence of hot turbine exhaust within the turbine exhaust port 350. The wastewater steam may be directed away from the turbine system (e.g., 360) with the turbine exhaust. Continuing, FIG. 3B shows a cross-sectional perspective view of a portion of a turbine exhaust collector 300 and a wastewater heating track (e.g., 375, 380, 385) disposed within the interior of the turbine exhaust collector in accordance with one or more embodiments of the present invention. In certain embodiments, a wastewater evaporation turbine system (e.g., 360) may be made by modifying an existing turbine system, such as, for example, the Solar® Saturn® gas-fueled turbine. In such modifications, the turbine exhaust collector 300 may be cross-sectioned such that the wastewater heating track (e.g., 375, 380, 385) may be disposed within the interior 305 of the turbine exhaust collector 360. Once properly disposed and ported, the cross-sectional portions may be welded back together returning the turbine exhaust collector 300 to its former shape. While modification of existing turbine systems (e.g., 360) is possible, custom made wastewater evaporation turbine systems may be made for the purpose of wastewater evaporation in accordance with one or more embodiments of the present invention. Thermal blankets or insulation may be disposed outside and around the turbine exhaust collector 300 to insulate and retain heat within the turbine exhaust collector 300 that is used to heat the wastewater disposed therein that is ultimately converted to steam.

FIG. 4A shows a top-facing perspective view of a wastewater atomization nozzle 400 in accordance with one or more embodiments of the present invention. Wastewater atomization nozzle 400 may include a threaded end 415, a mounting bolt 420, and an atomization tip 425 that atomizes heated wastewater. Continuing, FIG. 4B shows a bottom-facing perspective view of a wastewater atomization nozzle 400 in accordance with one or more embodiments of the present invention. The threaded end 415 of the wastewater atomization nozzle 400 may include an orifice that fluidly communicates heated wastewater to the atomization tip 425. In certain embodiments, wastewater atomization nozzle 400 may include three turns per square inch. One of ordinary skill in the art will recognize that the number of turns may vary based on an application or design in accordance with one or more embodiments of the present invention. The atomization tip 425 may have a size and shape that efficiently atomizes heated wastewater. Continuing, FIG. 4C shows a top plan view of a wastewater atomization nozzle 400 in accordance with one or more embodiments of the present invention. Continuing, FIG. 4D shows a bottom plan view of a wastewater atomization nozzle 400 in accordance with one or more embodiments of the present invention. Continuing, FIG. 4E shows a front elevation view of a wastewater atomization nozzle 400 in accordance with one or more embodiments of the present invention. Continuing, FIG. 4F shows a rear elevation view of a wastewater atomization nozzle 400 in accordance with one or more embodiments of the present invention. Continuing, FIG. 4G shows a right-side elevation view of a wastewater atomization nozzle 400 in accordance with one or more embodiments of the present invention. Continuing, FIG. 411 shows a left-side elevation view of a wastewater atomization nozzle 400 in accordance with one or more embodiments of the present invention. In certain embodiments, wastewater atomization nozzle 400 may be composed of stainless steel. In other embodiments, wastewater atomization nozzle 400 may be composed of copper, aluminum, or brass. In still other embodiments, wastewater atomization nozzle 400 may be composed of an alloy having a high degree of thermal conductivity. One of ordinary skill in the art will recognize that any metal, alloy, or synthetic material having a high degree of thermal conductivity may be used in accordance with one or more embodiments of the present invention. One of ordinary skill in the art will recognize that the size, shape, and number of wastewater atomization nozzles 400 may vary based on an application or design in accordance with one or more embodiments of the present invention.

FIG. 5A shows a rear elevation view of a mobile wastewater evaporation system 100 in operative use 500 in accordance with one or more embodiments of the present invention. An exterior wastewater hose 205 may fluidly connect to the exterior wastewater inlet connector (e.g., 162) to provide the source of wastewater to be evaporated by the wastewater evaporation turbine system 360. An exterior fuel hose 220 may fluidly connect to the exterior fuel inlet connector (e.g., 164) to provide fuel for the turbine system 360. Continuing, FIG. 5B shows a right-side perspective view of a mobile wastewater evaporation system 100 in operative use 500 in accordance with one or more embodiments of the present invention. The turbine exhaust port 350 may be disposed, with additional ducting and venting as necessary, such that turbine exhaust flows out of the exhaust window (e.g., 150) of the mobile trailer 110. Continuing, FIG. 5C shows a right-side perspective view of a mobile wastewater evaporation system 100 in operative use 500 in accordance with one or more embodiments of the present invention. Heated wastewater may be converted to wastewater steam and directed away from the turbine system (e.g., 360) with the turbine exhaust through the turbine exhaust port 350. The wastewater steam and turbine exhaust, collectively shown as reference numeral 510, may be directed out of the exhaust window 150 of the mobile trailer 110 and away from the system 100.

While the wastewater evaporation system disclosed herein has been described as being optionally mobile and optionally remotely controllable, one of ordinary skill in the art, having the benefit of this disclosure, will readily appreciate that the wastewater evaporation system may not be mobile and may not be remotely controllable, in accordance with one or more embodiments of the present invention.

Figure 6:
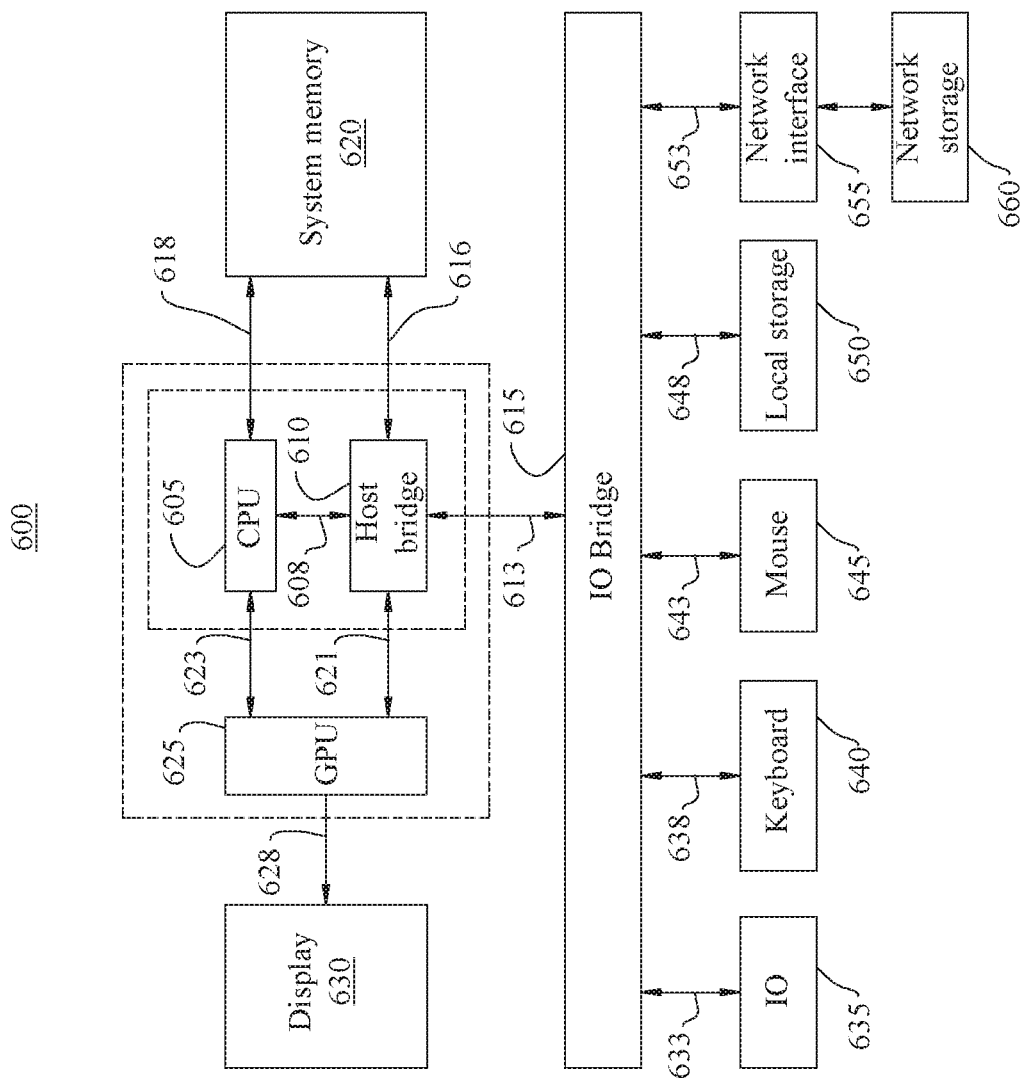
FIG. 6 shows an exemplary control system of a mobile wastewater evaporation system in accordance with one or more embodiments of the present invention.

FIG. 6 shows an exemplary computer or control system 600 of a mobile wastewater evaporation system 100 in accordance with one or more embodiments of the present invention. Control system 600 may control various aspects of a mobile wastewater evaporation system (e.g., 100), including, starting and stopping the turbine system (e.g., 360), controlling the wastewater inlet actuator (e.g., 210), controlling all aspects of the fuel system (e.g., 225, 230, 235, and 240) of the turbine system (e.g., 360), and controlling operational aspects of the turbine system (e.g., 360). Control system 600 may include communication capabilities such as, for example, a network connection, a cellular network connection, or a satellite network connection. The communication capabilities may enable a remote operator, not located on site, to control various aspects of the mobile wastewater evaporation system (e.g., 100). As such, control system 600 may vary from a simple PLC based system (e.g., 260, 265) to a more complex computing system as depicted in FIG. 6. Thus, the description of control system 600 is merely exemplary and not intended to limit the type, kind, or configuration of component devices that constitute a control system 600 in accordance with one or more embodiments of the present invention.

An exemplary control system 600 may include one or more of Central Processing Unit ("CPU") 605, host bridge 610, Input/Output ("IO") bridge 615, Graphics Processing Unit ("GPUs") 625, Application-Specific Integrated Circuit ("ASIC") (not shown), and PLC (e.g., 260, 265) disposed on one or more printed circuit boards (not shown) that perform computational or logical operations. Each computational device may be a single-core device or a multi-core device. Multi-core devices typically include a plurality of cores (not shown) disposed on the same physical die (not shown) or a plurality of cores (not shown) disposed on multiple die (not shown) that are collectively disposed within the same mechanical package (not shown). CPU 605 may be a general-purpose computational device that executes software instructions. CPU 605 may include one or more of interface 608 to host bridge 610, interface 618 to system memory 620, and interface 623 to one or more IO devices, such as, for example, one or more optional GPUs 625. GPU 625 may serve as a specialized computational device that typically performs graphics functions related to frame buffer manipulation. However, one of ordinary skill in the art will recognize that GPU 625 may be used to perform non-graphics related functions that are computationally intensive. In certain embodiments, GPU 625 may interface 625 directly with CPU 605 (and indirectly interface 618 with system memory 620 through CPU 605). In other embodiments, GPU 625 may interface 621 directly with host bridge 610 (and indirectly interface 616 or 618 with system memory 620 through host bridge 610 or CPU 605 depending on the application or design). In still other embodiments, GPU 625 may directly interface 633 with IO bridge 615 (and indirectly interface 616 or 618 with system memory 620 through host bridge 610 or CPU 605 depending on the application or design). One of ordinary skill in the art will recognize that GPU 625 includes on-board memory as well. In certain embodiments, the functionality of GPU 625 may be integrated, in whole or in part, with CPU 605 and/or host bridge 610, if included at all.

Host bridge 610 may be an interface device that interfaces between the one or more computational devices and IO bridge 615 and, in some embodiments, system memory 620. Host bridge 610 may include interface 608 to CPU 605, interface 613 to IO bridge 615, for embodiments where CPU 605 does not include interface 618 to system memory 620, interface 616 to system memory 620, and for embodiments where CPU 605 does not include an integrated GPU 625 or interface 623 to GPU 625, interface 621 to GPU 1225. The functionality of host bridge 610 may be integrated, in whole or in part, with CPU 1205 and/or GPU 625. TO bridge 615 may be an interface device that interfaces between the one or more computational devices and various IO devices (e.g., 640, 645) and IO expansion, or add-on, devices (not independently illustrated). IO bridge 615 may include interface 613 to host bridge 610, one or more interfaces 633 to one or more IO expansion devices 635, interface 638 to optional keyboard 640, interface 643 to optional mouse 645, interface 648 to one or more local storage devices 650, and interface 653 to one or more optional network interface devices 655. The functionality of IO bridge 615 may be integrated, in whole or in part, with CPU 605, host bridge 610, and/or GPU 625. Each local storage device 650, if any, may be a solid-state memory device, a solid-state memory device array, a hard disk drive, a hard disk drive array, or any other non-transitory computer readable medium. An optional network interface device 655 may provide one or more network interfaces including any network protocol suitable to facilitate networked communications. Control system 600 may include one or more optional network-attached storage devices 660 in addition to, or instead of, one or more local storage devices 650. Each network-attached storage device 660, if any, may be a solid-state memory device, a solid-state memory device array, a hard disk drive, a hard disk drive array, or any other non-transitory computer readable medium. Network-attached storage device 660 may or may not be collocated with control system 600 and may be accessible to control system 600 via one or more network interfaces provided by one or more network interface devices 655.

One of ordinary skill in the art will recognize that control system 600 may be a conventional computing system such as that depicted in FIG. 6 or an application-specific computing system (not shown) configured for industrial applications, such as a PLC based system (e.g., 260, 265). In certain embodiments, an application-specific computing system (not shown) may include one or more ASICs (not shown) or PLCs (e.g., 260, 265) that perform one or more specialized functions in a more efficient manner. The one or more ASICs (not shown) or PLCs (e.g., 260, 265) may interface directly with CPU 605, host bridge 610, or GPU 625 or interface through IO bridge 615. Alternatively, in other embodiments, an application-specific computing system (not shown) may represent a reduced number of components that are necessary to perform a desired function or functions in an effort to reduce one or more of chip count, printed circuit board footprint, thermal design power, and power consumption. In such embodiments, the one or more ASICs (not shown) and/or PLCs (e.g., 260, 265) may be used instead of one or more of CPU 605, host bridge 610, TO bridge 615, or GPU 625, and may execute software instructions. In such systems, the one or more ASICs (not shown) or PLCs or (e.g., 260, 265) may incorporate sufficient functionality to perform certain network, computational, or logical functions in a minimal footprint with substantially fewer component devices.

As such, one of ordinary skill in the art will recognize that CPU 605, host bridge 610, IO bridge 615, GPU 625, ASIC (not shown), or PLC (not shown) or a subset, superset, or combination of functions or features thereof, may be integrated, distributed, or excluded, in whole or in part, based on an application, design, or form factor in accordance with one or more embodiments of the present invention. Thus, the description of control system 600 is merely exemplary and not intended to limit the type, kind, or configuration of component devices that constitute a control system 600 suitable for performing computing operations in accordance with one or more embodiments of the present invention.

In one or more embodiments of the present invention, a method of wastewater evaporation using a turbine may include fluidly communicating wastewater to a track inlet of a wastewater heating track disposed within an interior of an exhaust collector of the turbine, where the wastewater is heated by turbine exhaust in the interior of the exhaust collector while being fluidly communicated by the wastewater heating track to a track outlet from the wastewater heating track and fluidly communicating the heated wastewater from the track outlet to a plurality of wastewater atomization nozzles that direct atomized wastewater into an interior of an exhaust port of the turbine. The atomized wastewater may be converted into steam in the presence of turbine exhaust. The track outlet may fluidly communicate wastewater to a wastewater manifold disposed outside of the exhaust collector that fluidly communicates the wastewater to the plurality of wastewater atomization nozzles. The wastewater heating track may include a plurality of wastewater pipe segments that fluidly connect the wastewater heating track inlet to the wastewater heating track outlet. The wastewater heating track may be disposed within the interior of the exhaust collector of the turbine in a flow path of turbine exhaust that surrounds the wastewater heating track. A plurality of conduits may fluidly connect the wastewater manifold to the plurality of wastewater atomization nozzles. The plurality of wastewater atomization nozzles may be at least partially disposed within the exhaust port of the turbine. The plurality of wastewater atomization nozzles may be arranged in a pattern that directs atomized wastewater into the interior of the exhaust port of the turbine.

In one or more embodiments of the present invention, a system for wastewater evaporation may include a turbine having an exhaust collector and an exhaust port, a wastewater heating track disposed within an interior of the exhaust collector, where a track inlet to the wastewater heating track receives wastewater that is heated by turbine exhaust in the interior of the exhaust collector while being fluidly communicated by the wastewater heating track to a track outlet from the wastewater heating track, and a plurality of wastewater atomization nozzles that atomize wastewater from the wastewater heating track into an interior of the exhaust port. The atomized wastewater may be converted to steam in the presence of turbine exhaust in the exhaust port of the turbine. A wastewater manifold may fluidly connect the track outlet to the exhaust port via the plurality of wastewater atomization nozzles. The wastewater heating track may include a plurality of wastewater pipe segments that fluidly connect the wastewater heating track inlet to the wastewater heating track outlet. The wastewater heating track may be disposed within the interior of the exhaust collector of the turbine in a flow path of turbine exhaust that surrounds the wastewater heating track. A plurality of conduits may fluidly connect the wastewater manifold to the plurality of wastewater atomization nozzles. The plurality of wastewater atomization nozzles may be at least partially disposed within the exhaust port of the turbine. The plurality of wastewater atomization nozzles may be arranged in a pattern that directs atomized wastewater into the interior of the exhaust port of the turbine.

In one or more embodiments of the present invention, a mobile wastewater evaporation system includes a mobile trailer having an exterior wastewater inlet connector, a turbine having an exhaust collector disposed within the mobile trailer and an exhaust port configured to convey turbine exhaust out of an exhaust window of the mobile trailer, a wastewater heating track disposed within an interior of the exhaust collector, where a track inlet to the wastewater heating track receives wastewater that is heated by turbine exhaust in the interior of the exhaust collector while being fluidly communicated by the wastewater heating track to a track outlet from the wastewater heating track, a plurality of wastewater atomization nozzles that direct atomized wastewater into an interior of the exhaust port, where the atomized wastewater is converted to steam in the presence of turbine exhaust in the exhaust port of the turbine, and a control system that controls operation of the turbine. A wastewater manifold may fluidly connect the track outlet to the exhaust port via the plurality of wastewater atomization nozzles. The wastewater heating track may include a plurality of wastewater heating pipes that fluidly connect the wastewater heating track inlet to the wastewater heating track outlet. The wastewater heating track may be disposed within the interior of the exhaust collector of the turbine in a flow path of turbine exhaust that surrounds the wastewater heating track. A plurality of conduits may fluidly connect the wastewater manifold to the plurality of wastewater atomization nozzles. The plurality of wastewater atomization nozzles may be at least partially disposed within the exhaust port of the turbine. The plurality of wastewater atomization nozzles may be arranged in a pattern that directs atomized wastewater into the interior of the exhaust port of the turbine. The control system may be configured to start or stop the turbine. The control system may be remotely controllable.

Advantages of one or more embodiments of the present invention may include one or more of the following:

In one or more embodiments of the present invention, a method and system of wastewater evaporation enables disposal of wastewater on-site at or very near the location where the wastewater is actually produced. The produced wastewater may be conveyed directly or via an intermediate holding area to a wastewater evaporation system for evaporation of the wastewater on site.

In one or more embodiments of the present invention, a method and system of wastewater evaporation may be remotely controlled such that the wastewater evaporation system may be turned on or off remotely by a person located off-site. The wastewater evaporation system may include a communication system and a control system that enable remote control of all necessary components to engage or disengage the operation of the wastewater evaporation system.

In one or more embodiments of the present invention, a method and system of wastewater evaporation does not require on-site personnel to operate the wastewater evaporation system. Personnel are not exposed to wastewater or the high temperature steam generated by the wastewater evaporation system. Advantageously, the safety of operations is increased.

In one or more embodiments of the present invention, a method and system of wastewater evaporation enables the on-site disposal of approximately 100,000 gallons of wastewater per light industrial turbine per day.

In one or more embodiments of the present invention, a method and system of wastewater evaporation may be powered by flare gas generated from fracking, drilling, or production operations on the site where the wastewater evaporation system is deployed to dispose of wastewater.

In one or more embodiments of the present invention, a method and system of wastewater evaporation may have a wastewater-to-steam conversion efficiency rating of 95 percent or more.

In one or more embodiments of the present invention, a method and system of wastewater evaporation substantially reduces costs associated with wastewater disposal.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should only be limited by the appended claims.

What is claimed is:

1. A method of wastewater evaporation using a light industrial gas-fueled turbine comprising:
    disposing a wastewater heating track within an interior of an exhaust collector of the turbine;
    disposing a plurality of wastewater atomization nozzles at least partially within an exhaust port of the turbine;
    fluidly communicating wastewater from a track inlet to a track outlet of the wastewater heating track, wherein the wastewater is heated by turbine exhaust in the interior of the exhaust collector while being fluidly communicated; and
    fluidly communicating the wastewater from the track outlet to the plurality of wastewater atomization nozzles that direct atomized wastewater into an interior of the exhaust port of the turbine,
    wherein the atomized wastewater is converted into steam in the presence of turbine exhaust within the exhaust port of the turbine.

2. The method of claim 1, wherein the track outlet fluidly communicates the wastewater to a wastewater manifold disposed outside of the exhaust collector that fluidly communicates the wastewater to the plurality of wastewater atomization nozzles.

3. The method of claim 1, wherein the wastewater heating track comprises a plurality of wastewater pipe segments that fluidly connect the wastewater heating track inlet to the wastewater heating track outlet.

4. The method of claim 1, wherein the wastewater heating track is disposed within the interior of the exhaust collector of the turbine in a flow path of turbine exhaust that surrounds the wastewater heating track.

5. The method of claim 1, wherein a plurality of conduits fluidly connect the wastewater manifold to the plurality of wastewater atomization nozzles.

6. The method of claim 1, wherein the plurality of wastewater atomization nozzles are at least partially disposed within the exhaust port of the turbine.

7. The method of claim 1, wherein the plurality of wastewater atomization nozzles are arranged in a pattern that directs atomized wastewater into the interior of the exhaust port of the turbine.

8. A wastewater evaporation system comprising:
    a light industrial gas-fueled turbine comprising an exhaust collector and an exhaust port;
    a wastewater heating track disposed within an interior of the exhaust collector that fluidly communicates wastewater from a track inlet to a track outlet, wherein wastewater is heated by turbine exhaust in the interior of the exhaust collector while being fluidly communicated; and
    a plurality of wastewater atomization nozzles at least partially disposed within an interior of the exhaust port that atomize wastewater from the track outlet into an interior of the exhaust port,
    wherein the atomized wastewater is converted to steam in the presence of turbine exhaust within the exhaust port of the turbine.

9. The system of claim 8, wherein a wastewater manifold fluidly connects the track outlet to the exhaust port the plurality of wastewater atomization nozzles.

10. The system of claim 8, wherein the wastewater heating track comprises a plurality of wastewater pipe segments that fluidly connect the track inlet to the track outlet.

11. The system of claim 8, wherein the wastewater heating track is disposed within the interior of the exhaust collector of the turbine in a flow path of turbine exhaust that surrounds the wastewater heating track.

12. The system of claim 8, wherein a plurality of conduits fluidly connect the wastewater manifold to the plurality of wastewater atomization nozzles.

13. The system of claim 8, wherein the plurality of wastewater atomization nozzles are at least partially disposed within the exhaust port of the turbine.

14. The system of claim 8, wherein the plurality of wastewater atomization nozzles are arranged in a pattern that directs atomized wastewater into the interior of the exhaust port of the turbine.

15. A mobile wastewater evaporation system comprising:
    a mobile trailer comprising an exterior wastewater inlet connector;
    a light industrial gas-fueled turbine comprising an exhaust collector disposed within the mobile trailer and an exhaust port that conveys turbine exhaust out of an exhaust window of the mobile trailer;
    a wastewater heating track disposed within an interior of the exhaust collector that fluidly communicates wastewater from a track inlet to a track outlet, wherein wastewater is heated by turbine exhaust in the interior of the exhaust collector while being fluidly communicated;
    a plurality of wastewater atomization nozzles at least partially disposed within an interior of the exhaust port that atomize wastewater from the track outlet into an interior of the exhaust port, wherein the atomized wastewater is converted to steam in the presence of turbine exhaust within the exhaust port of the turbine; and a control system that controls operation of the turbine.

16. The mobile wastewater evaporation system of claim 15, wherein a wastewater manifold fluidly connects the track outlet to the exhaust port via the plurality of wastewater atomization nozzles.

17. The mobile wastewater evaporation system of claim 15, wherein the wastewater heating track comprises a plurality of wastewater heating pipes that fluidly connect the track inlet to the track outlet.

18. The mobile wastewater evaporation system of claim 15, wherein the wastewater heating track is disposed within the interior of the exhaust collector of the turbine in a flow path of turbine exhaust that surrounds the wastewater heating track.

19. The mobile wastewater evaporation system of claim 15, wherein a plurality of conduits fluidly connect the wastewater manifold to the plurality of atomization nozzles.

20. The mobile wastewater evaporation system of claim 15, wherein the plurality of atomization nozzles are at least partially disposed within the exhaust port of the turbine.

21. The mobile wastewater evaporation system of claim 15, wherein the plurality of atomization nozzles are arranged in a pattern that directs atomized wastewater into the interior of the exhaust port of the turbine.

22. The mobile wastewater evaporation system of claim 15, wherein the control system is configured to start or stop the turbine.

23. The mobile wastewater evaporation system of claim 15, wherein the control system is remotely controllable.

\* \* \* \* \*